United States Patent [19]

Brouard et al.

[11] 4,012,369
[45] Mar. 15, 1977

[54] MONOAZO CHROMIFEROUS COMPLEX DYESTUFFS DERIVED FROM NAPHTHYL-AZO-NAPHTHALENE, AND PROCESS FOR THEIR PREPARATION

[75] Inventors: Claude Marie Henri Emile Brouard, Scotteville les Rouen; Paulette Gisele Ficht, Mont Saint Aignan, both of France

[73] Assignee: Produits Chimiques Ugine Kuhlmann, Paris, France

[22] Filed: Feb. 25, 1974

[21] Appl. No.: 445,185

[30] Foreign Application Priority Data

Mar. 2, 1973 France .................... 73.07457

[52] U.S. Cl. ..................... 260/146 R; 260/150
[51] Int. Cl.² ................ C09B 45/16; D06P 1/10; D06P 3/24
[58] Field of Search .......... 260/150, 151, 148, 149, 260/147, 146 R

[56] References Cited

UNITED STATES PATENTS

| | | | |
|---|---|---|---|
| 2,708,193 | 5/1955 | Pfitzner et al. | 260/147 |
| 2,871,332 | 1/1959 | Csendes | 260/147 |
| 3,125,561 | 3/1964 | Beffa et al. | 260/151 X |
| 3,301,845 | 1/1967 | Hosokawa et al. | 260/146 R |
| 3,356,671 | 12/1967 | Johnson et al. | 260/147 X |
| 3,538,073 | 11/1970 | Mack et al. | 260/146 R |
| 3,551,406 | 12/1970 | Idelson | 260/147 |
| 3,728,328 | 4/1973 | Lienhard et al. | 260/147 |

OTHER PUBLICATIONS

Idelson et al., J. Am. Chem. Soc., vol. 88, pp. 186–187 (1966).

*Primary Examiner*—Floyd D. Higel
*Attorney, Agent, or Firm*—Beveridge, DeGrandi, Kline, Lunsford

[57] ABSTRACT

Monoazo chromiferous dyestuffs of the formula:

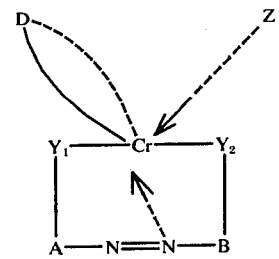

in which A and B each represent a naphthalenic nucleus, one of the residues A and B carrying a sulphonic acid group, $Y_1$ represents —O— or

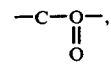

$Y_2$ represents —O— or

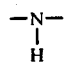

and $Y_1$ and $Y_2$ are each in a vicinal position with respect to the azo group, D is the residue of a β-diketone bidentate chelating agent and Z represents water, ammonia or pyridine, and process for the preparation of such dyestuffs.

7 Claims, No Drawings

MONOAZO CHROMIFEROUS COMPLEX DYESTUFFS DERIVED FROM NAPHTHYL-AZO-NAPHTHALENE, AND PROCESS FOR THEIR PREPARATION

The present invention relates to new monoazo chromiferous complex dyestuffs derived from naphthyl-azo-naphthalene, and to a process for their preparation.

These new monoazo chromiferous complex dyestuffs correspond to the general formula:

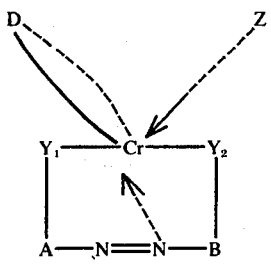

and B each represent a naphthalenic nucleus, one of the residues A and B carrying a sulphonic acid group, $Y_1$ represents —O— or

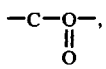

$Y_2$ represents —O— or

$Y_1$ and $Y_2$ are each in a vicinal position with respect to the azo group, D is the residue of a β-diketone bidentate chelating agent and Z represents water, ammonia or pyridine.

The new dyestuffs have in their molecule only one sulphonic acid group.

By "vicinal position" is meant not only the ortho or alpha position but also the peri position.

Acetylacetone is the preferred bidentate chelating agent D according to the invention, but the β-diketones homologous therewith such as hexane-3,5-dione, may also be used. It is to be understood that if $Y_1$ is

then the carbon atom is directly connected to the residue A.

The invention relates also to a process for the preparation of the new chromiferous complex dyestuffs defined above, in which a β-diketone bidentate chelating agent is reacted with a 1:1 chromium complex of a dyestuff of the formula:

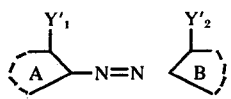

in the presence of water, ammonia, or a mineral base or pyridine or a mixture thereof, A and B being as defined above, $Y'_1$ representing hydroxy, methoxy or carboxy and $Y'_2$ representing hydroxy or amino, $Y'_1$ and $Y'_2$ being respectively in a vicinal position with respect to the group —N=N—. The reaction is carried out in aqueous medium, and preferably in an alkaline medium, and the operation is generally effected at a temperature between 20° and 100° C. The yields are generally excellent.

A large number of dyestuffs of the formula (II) are already known of themselves, as well as their 1:1 chromium complex, to which a structure corresponding to the following general formula may be attributed:

in which A, B, $Y_1$, $Y_2$ and Z have the significance defined above.

The dyestuffs of formula (III) can easily be obtained for example by heating a dyestuff of formula (II) with a trivalent chromium salt, such as for example chromic chloride or basic sulphate of chromium, in aqueous medium at a temperature of from 90° to 150° C.

The new dyestuffs are distinguished from the initial 1:1 complexes by the very different and very valuable tinctorial properties, especially in the colouration of the natural or synthetic polyamides. In fact, it is known that the 1:1 chromium complexes are only able to color the natural or synthetic polyamides in a strongly acid bath, i.e., having a pH below 4 (generally sulphuric acid) and this causes the fibres to deteriorate and their handle to be modified (Synthetic dyes by Venkataraman, Volume III, p. 305). The new complexes have the advantage of being able to dye or print the natural or synthetic polyamides in a neutral to weakly acid, i.e., having a pH of 4 or above, medium and consequently permit one to make the most of the properties of the fibres.

Further, the brilliancy of the shades is most frequently superior to that of the initial 1:1 chromium complexes, and the exhaustion of the bath and the tinctorial yields are good, even excellent.

Surprisingly these advantages of brilliancy, exhaustion and tinctorial yield peculiar to the invention could not have been obtained if the bidentate chelating agent D according to the invention had been replaced by another chelating agent such as 8-hydroxyquinolines.

The fastness to wet tests and especially to light of the dyestuffs of the invention are excellent, and the stability to heat is very good.

It could not been foreseen that the remarkable fastness of the new dyestuffs could not have been attained if the initial dyestuffs (II) of the invention had been replaced by other initial dyestuffs derived from the naphthyl-azo-pyrazol-ones.

It is surprising that acid dyestuffs such as those of the present invention enable natural or synthetic polyamides to be dyed in a neutral to weakly acid medium and the advantageous results described above to be obtained.

The dyestuffs of the invention may be applied with particular advantage to the dyeing or printing of natural or synthetic polyamides more especially in the presence of water at a pH between 4 and 7.

The invention also relates to natural or synthetic polyamides dyed or printed by means of the new dyestuffs.

The invention is illustrated by the following Examples, in which the parts are parts by weight.

EXAMPLE 1

59.1 parts of the 1/1 chromium complex of the dyestuff [4-sulpho-2-hydroxy-naphthalene]-<1 azo 1<[2-hydroxy-naphthalene] are made into a paste in 600 parts of water at 75° C. 11.7 parts of acetylacetone and 35 parts of pyridine are added, and after stirring for several hours, the end of the condensation is checked by chromatography, and the dyestuff is crystallized by cooling, filtered off and dried. It corresponds to the formula:

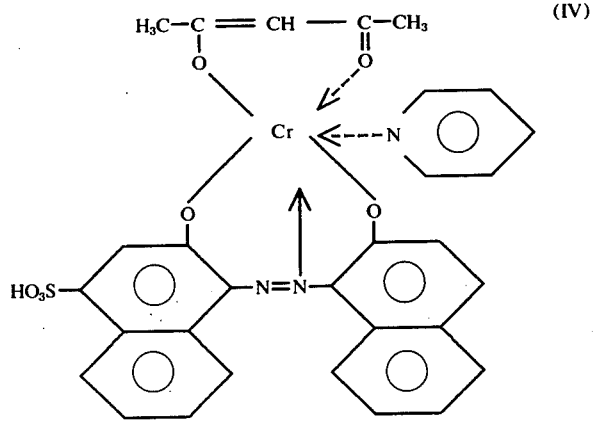

(IV)

It dyes polyamides in a blue shade of good general fastness.

EXAMPLE 2

0.1 parts of the dyestuff of Example 1 are dissolved in 100 parts of water containing 0.5 parts of 10% acetic acid. 5 parts of polyamides or wool are added at 50° C., the temperture is increased to 100° C. in a period of half an hour and maintained for an hour at the boil. A bluish red shade is obtained of very good general fastness.

On operating in a way analogous to that described in Example 1, there are obtained, starting from the 1/1 chromium complexes of the monoazo dyestuffs, of which the diazotisation compounds and coupling compounds are indicated in columns II and III of the following Table, the shades on polyamides which are given in column IV.

EXAMPLE 7

On operating in an analogous manner to that of Example 1, there is obtained from the 1/1 chromium complex of [4-sulpho-2-hydroxy-naphthalene]-<1 azo 2>-[4-methyl-1-hydroxy-naphthalene] a blue shade on polyamide of good general fastness. For the synthesis of the initial monoazo dyestuff, the diazotisation component was 4-sulpho-1-amino-2-naphthol and the coupling compound was 4-methyl-1-naphthol.

We claim:

1. Monoazo chromiferous dyestuff of the formula:

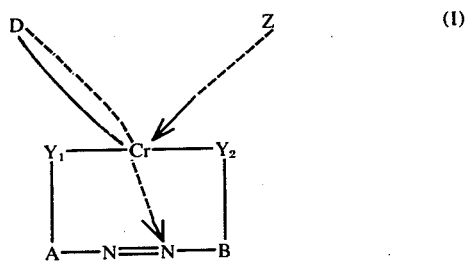

(I)

in which A and B each represent naphthalyl, one of A and B carrying a sulphonic acid group, $Y_1$ represents —O— or

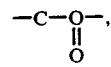

$Y_2$ represents —O— or

and $Y_1$ and $Y_2$ are each in a vicinal position with respect to the azo group, D is a β-diketonyl bidentate chelating agent and Z represents water, ammonia or pyridine.

2. Dyestuff according to claim 1 wherein D is acetoacetonyl.

3. Dyestuff of the formula:

| I Example | II Diazotisation compounds | III Coupling compounds | IV Shades |
|---|---|---|---|
| 3 | 4-sulpho-1-amino-2-naphthol | Alpha-naphthol | blue |
| 4 | 6-nitro-4-sulpho-1-amino-2-naphthol | Beta-naphthol | black |
| 5 | ″ ″ | Alpha-naphthol | black |

4. Dyestuff of the formula:

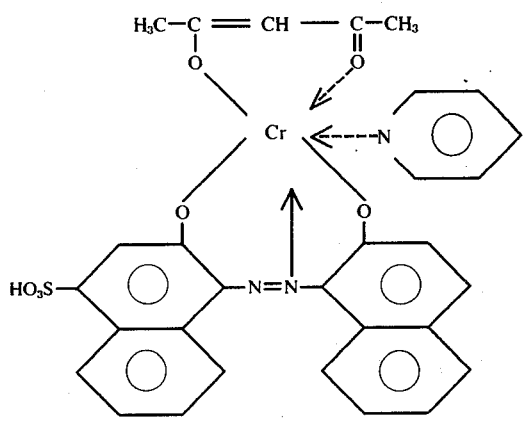

(IV)

4. Dyestuff of the formula:

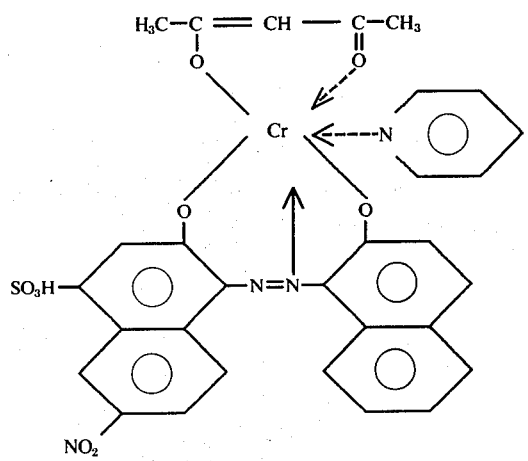

5. Dyestuff of the formula:

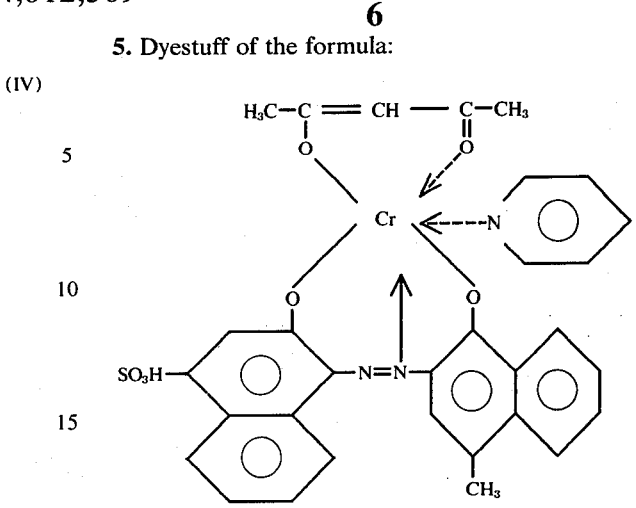

6. Process for the preparation of the complex dyestuff of the formula given in claim 1 in which a β-diketone bidentate chelating agent is reacted in an aqueous alkaline medium at a temperature of from 20° to 100° C with a 1:1 chromium complex of a dyestuff of the formula:

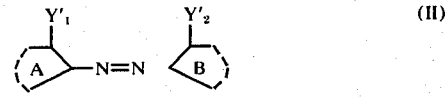

(II)

in the presence of water, ammonia, a mineral base or pyridine or of any mixture thereof, A and B being as defined in claim 1, $Y'_1$ representing hydroxy, methoxy or carboxy and $Y'_2$ representing hydroxy or amino, and $Y'_1$ and $Y'_2$ being respectively in a vicinal position with respect of the group —N=N—.

7. Process according to claim 6 in which the chelating agent is acetylacetone.

* * * * *